(No Model.)
W. MURPHY.
STONE SAWING MACHINE.
No. 369,463. Patented Sept. 6, 1887.
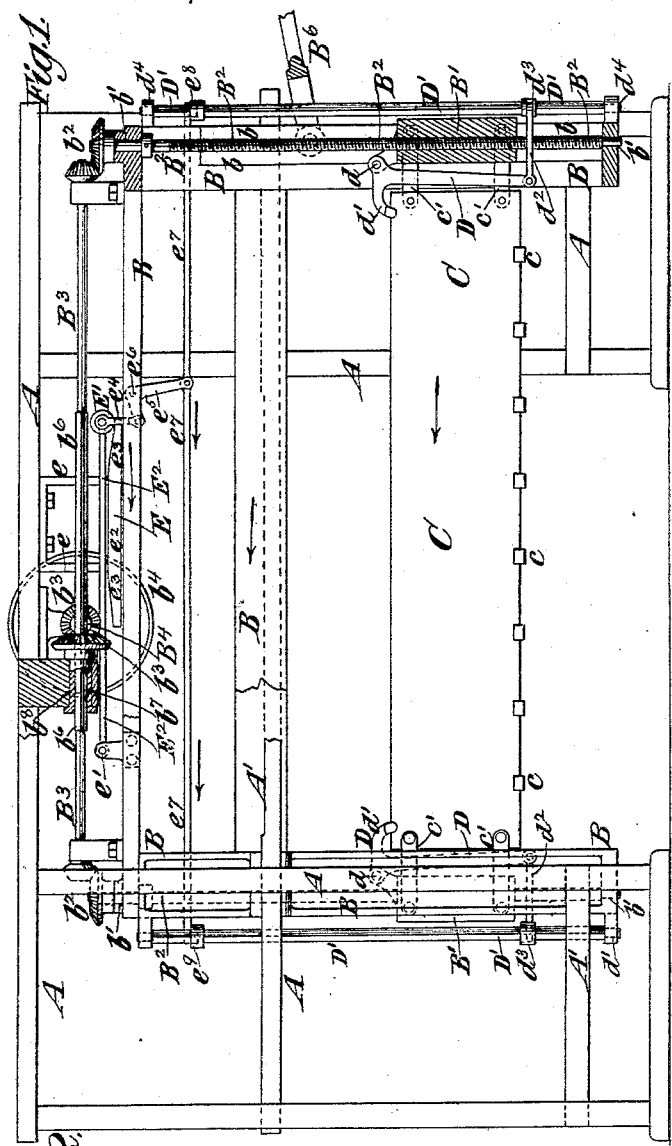
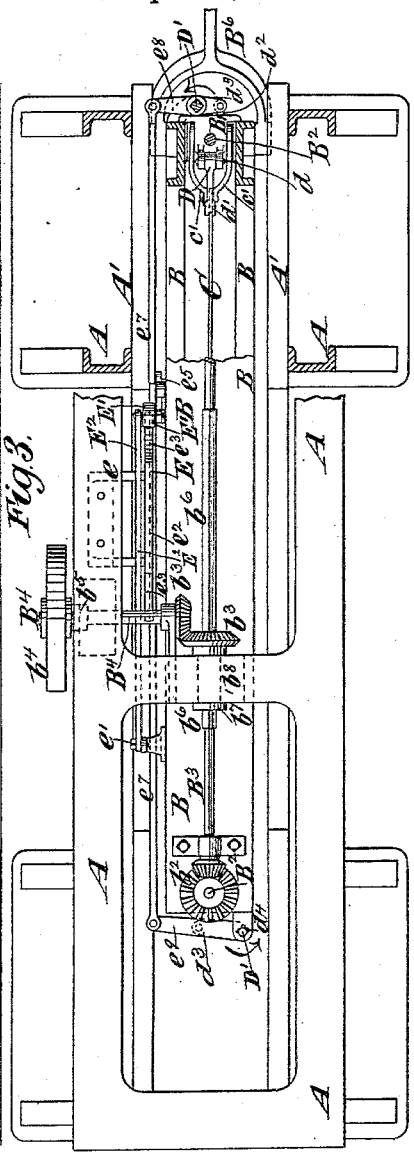
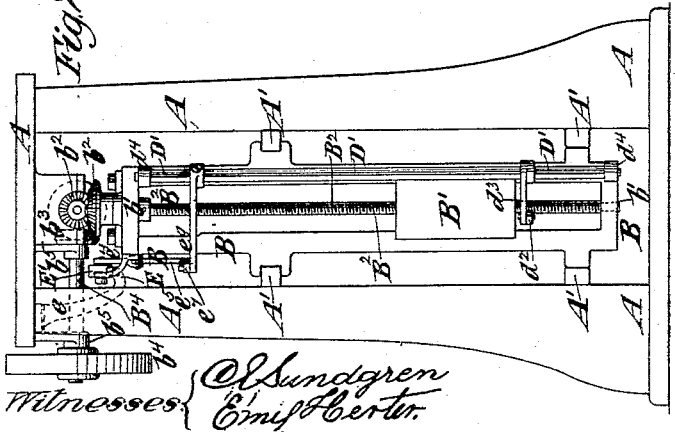
Witnesses: O. Sundgren, Emil Herter.
Inventor: William Murphy by his attys. Brown & Hall

UNITED STATES PATENT OFFICE.

WILLIAM MURPHY, OF NEW YORK, N. Y.

STONE-SAWING MACHINE.

SPECIFICATION forming part of Letters Patent No. 369,463, dated September 6, 1887.

Application filed March 5, 1887. Serial No. 229,759. (No model.)

*To all whom it may concern:*

Be it known that I, WILLIAM MURPHY, of the city and county of New York, in the State of New York, have invented a new and useful Improvement in Stone-Sawing Machines, of which the following is a specification.

My invention relates to stone-sawing machines in which is employed a reciprocating blade armed with tools in which are set diamonds, borts, or other hard stones, by which the cutting of the stone is effected. During the early use of saws of this character it was deemed impracticable, owing to the imperfect method of setting the diamonds or borts, to have them operate or cut during the reciprocating movement of the saw-blade in both directions; but more recently, owing to the perfection which has been attained in setting the diamonds or borts, it has been found to be practicable to have them cut during the movement of the saw-blade in both directions, and the amount of work performed is thereby increased.

In operating saws of this character the saw is commonly hung in a reciprocating sash or frame, so that it may be depressed slightly by a pressure exerted upon its top, and so that it will rise slightly in and relatively to the sash when such pressure is relieved, and this rising movement of the saw is commonly termed the "lift," although it consists rather in relieving the downward pressure upon the saw than in imparting any positive upward movement thereto.

My invention relates more particularly to saws which operate to cut when moving in both directions, and I have found that by giving the saw a slight lift at each end of its movement the amount of resistance opposed to the movement of the saw will be greatly decreased, while its cutting capacity will remain about the same. For example, in operating with a saw having a reciprocating movement of thirty-six inches in each direction, if the saw is relieved or permitted to move upward for a distance of about nine inches from each end, so that only eighteen inches of the reciprocating movement is performed with the saw pressed downward upon the work, an amount of cutting about equal to that which would be performed if the saw were pressed downward during the whole thirty-six inches is performed, while the resistance to the operation of the saw frame or sash is reduced nearly one-half.

The object of my invention is to provide a very simple means for producing this lifting or relieving of the saw in the sash; and my invention consists, essentially, in the combination, in a diamond saw, with a saw sash or frame and guides for maintaining its path of reciprocation uniform, a saw supported in the sash to provide for its feeding movement in the sash toward the stone, levers whereby pressure upon the saw toward the stone may be exerted, and upright shafts journaled in the sash and having arms connected with said levers for operating them, of a cam consisting of a straight edge terminating in an incline at one or each end and a bearer which may consist of a roller on which the cam acts, one of said two parts being stationary and the other reciprocated with the sash, and being free to rise and fall by the action of the incline or inclines of the cam, lever, and rod connections between the part which so rises and falls and said upright shafts, whereby when the bearer reaches the incline or inclines of the cam the levers will be actuated to relax their pressure on the saw.

In the accompanying drawings, Figure 1 is a side elevation, partly in section, of a stone-sawing machine embodying my invention, and which somewhat resembles that forming the subject of Letters Patent No. 224,760, granted February 17, 1880, to Hugh Young. Fig. 2 is an end elevation of such a machine, looking from the left hand of Fig. 1; and Fig. 3 is a plan thereof, also partly in horizontal section.

Similar letters of reference designate corresponding parts in the several figures.

A designates the stationary frame, which is usually constructed of metal, and B designates the saw sash or frame, which may be reciprocated by suitable mechanism—such, for instance, as a connecting-rod, $B^6$, driven from a crank. (Not here shown.) The sash or frame B is fitted to suitable guides, A', secured upon the frame A, as represented best in Fig. 2, and in its reciprocation it carries with it the saw-blade C, which is armed at the edge with tools *c*, in which are set diamonds, borts, or other hard cutting-stones. The guides A' maintain the sash in a uniform path of reciprocation.

In order to produce the proper feed as the cutting progresses, the saw and the stone to be cut are moved one toward the other, and in this example of my invention the desired feed is effected by moving the saw downward in its sash or frame B toward the stone. (Not here shown.) I have here represented blocks or saw-carriers B' as fitted to slide upward and downward in suitable guides, $b$, in the sash or frame B and as forming nuts upon upright screws $B^2$, which are fitted to suitable bearings, $b'$, in the sash or frame B. The two screws $B^2$ at opposite ends of the sash or frame may be connected by a longitudinal shaft, $B^3$, and bevel-gearing $b^2$, and this shaft has rotary motion imparted to it by any suitable mechanism. In this example of my invention the shaft $B^3$ and (through it) the screws $B^2$ are operated from a cross-shaft, $B^4$, through bevel-gears $b^3$, and this cross-shaft may be driven at a very slow speed by any suitable mechanism—such, for example, as a belt running upon a pulley, $b^4$. The cross-shaft $B^4$ is mounted in stationary bearings $b^5$, and the gearing $b^3$, through which it operates the shaft $B^3$, must be maintained in proper relation therewith. I have here represented the shaft $B^3$ as having a square or polygonal portion, $b^6$, which slides through one of the wheels $b^3$ and a sleeve-journal, $b^7$, connected therewith and mounted in a suitable bearing, $b^8$. The wheel $b^3$ and the journal $b^7$, of which it forms part, are supported in the bearing $b^8$ against axial movement, and the square or polygonal portion $b^6$ of the shaft $B^3$ plays lengthwise through the journal $b^7$, and in all lengthwise positions receives motion from such journal portion and from the wheels $b^3$. This mechanism for feeding the saw downward is foreign to my invention, and any suitable devices for the purpose may be employed.

The saw-blade C is so supported upon the sliding blocks B' as to provide for its slight upward and downward movement relatively to them and to the sash or frame B, in which it is carried. I have here shown the ends of the saw-blade as connected by stirrups or links $c'$ with the blocks B', and it will be understood that a slight pressure upon the top edge of the blade will force it downward relatively to the blocks B', while the relaxing of such pressure will permit the saw to rise slightly and carry its tools $c$ out of contact with the stone. The mechanism through which this relief or lifting movement of the saw-blade C is effected I term the "lift-gearing," and it will be hereinafter described. I have here represented levers D as fulcrumed at $d$ to the blocks B' and as pressing by their upper arms, $d'$, upon the top of the saw-blade. The lower ends of these levers D, I have represented as connected by links $d^2$ with arms $d^3$, which are fitted to slide upward and downward on square or polygonal shafts D', supported in bearings $d^4$ at opposite ends of the saw sash or frame.

For producing the lift or relief movement of the saw-blade through the lift-gearing, I employ a cam, E, and a roller or bearer, E'. In this example of my invention, which is the simplest form thereof which can be adopted, the cam E is supported in stationary position by a bracket, $e$, and the roller or bearer E' is journaled in the arm $E^2$, which is pivoted at $e'$ to the saw sash or frame B, and is adapted, therefore, to rise and fall slightly. The cam, which is here represented as stationary, constitutes a track or way for the roller or bearer E', and consists of a straight-edged portion, $e^2$, having an incline, $e^3$, at one or each end thereof, the cam here represented having such an incline upon each end.

The bearings of the roller or bearer E' are connected by a link, $e^4$, with a bell-crank lever, $e^5$, which is fulcrumed at $e^6$, and this bell-crank lever is connected with a rod, $e^7$, which in turn is connected with arms $e^8 e^9$, fitted upon the square or polygonal shafts D'.

In the position of parts shown in Fig. 1, the sash or frame B and its saw-blade C are at the right-hand end of their movement, and the blade C is relieved of downward pressure and is at the top of its lift. If we suppose that the sash or frame now moves in the direction of the arrows shown in Fig. 1, the roller or bearer E' rides up on one of the inclines $e^3$ upon the track or cam E, and such rising movement, through the link $e^4$ and bell-crank lever $e^5$, produces a movement of the rod $e^7$ in a direction indicated by the arrows thereon in Fig. 1. This tends to turn the two rock-shafts in the directions indicated by the arrows on them in Fig. 2, and through the arms $d^3$ and links $d^2$ produces a pull upon the levers D in a direction to press their upper arms, $d'$, downward upon the top of the saw-blade C, and the saw-blade remains pressed down against the stone which is subjected to it during the time the roller or bearer E' traverses the straight-edged portion $e^2$ of the track or cam E. As soon as the roller or bearer E' reaches the incline $e^3$ at the opposite end of the track or cam, it falls or moves downward along said incline $e^3$, and produces or permits a movement of the connections $e^4$, $e^5$, $e^7$, D', $d^3$, $d^2$, and D, the reverse of the movement above described, thereby relieving the saw-blade C of pressure and permitting its supporting-links or stirrups $c'$ and the blade to rise slightly away from the stone.

During the time that the roller or bearer E' is traversing the incline $e^3$ of the track or cam E the resistance to the saw's movement is very much reduced, while the capacity of the saw for cutting remains substantially the same as if it were held in contact with stone during the whole of its movement. If we suppose, for example, that the stroke of the saw in each direction is thirty-six inches and that the cam or track E is made up of a straight-edged portion, $e^2$, of half that distance, or eighteen inches, terminating in inclines $e^3$, of nine inches each, the resistance of the saw to movement, due to its contact with the stone, will be about eighteen inches only in its movement in each direction, while the cutting capacity of the saw or work done will be about the same as if the saw were maintained or pressed into contact with the stone during the entire thirty-six inches of movement. I have here represented the track or cam E as having an incline, $e^3$, at each end; but it might have such an incline at one end only, and then the saw would be relieved and permitted to rise at one end only of its stroke. In speaking of the portion $e^2$ of the track or cam E as a straight edge I do not mean that it must be a mechanically true and straight surface, but merely that it is substantially straight as distinguished from the inclines $e^3$ at its ends.

The inclines $e^3$ may be very gradual and have the effect of bringing the tools $c$ against the stone very gradually and avoiding any shock which might tend to loosen them in their settings.

I am aware that in what are known as "sand-saws," in which a saw or a number of saws are fast in a sash, the sash moving toward the stone by its weight as the cutting progresses, the sash has been lifted to a considerable degree at the end of the stroke to enable the sand or abrading material to get under the saw-blades, and while it might be practicable to so lift the sash of a sand-saw, which is comparatively light, it is impracticable to lift the whole sash of a diamond saw at each end of the stroke, as it weighs often several tons. I therefore exclude such sand-saws from my invention.

I am also aware that in the patents to Hugh Young, No. 224,760, granted February 17, 1880, and No. 173,709, granted February 15, 1876, the saw has been given a lift at the end of the stroke, but by mechanism very different from that which I employ, and no means has been used so simple and desirable as my simple straight-edged cam E, having inclines at the edge and the bearer or roller E', and no means has ever been employed which would cause the saw to be relieved at a considerable distance from each end and make a considerable portion of its stroke at each end thereof while maintained out of cutting contact with the bottom of the kerf.

What I claim as my invention, and desire to secure by Letters Patent, is—

In a diamond saw, the combination, with a saw sash or frame and guides for maintaining its path of reciprocation uniform, and a saw supported in the sash to provide for its feeding movement in the sash toward the stone levers, as D, whereby pressure upon the saw toward the stone may be exerted, and upright shafts, as D', journaled in the sash and having arms connected with said levers for operating them, of a cam consisting of a straight edge, as E, terminating in an incline at one or each end, and a bearer, as E', on which the cam acts, one of said two parts being stationary and the other reciprocated with the sash, and being free to rise and fall by the action of the incline or inclines of the cam, lever, and rod connections between the part which so rises and falls and said upright shafts, whereby when the bearer reaches the incline of the cam the levers D will be actuated to relax their pressure on the saw, substantially as herein described.

WILLIAM MURPHY.

Witnesses:
C. HALL,
FREDK. HAYNES.